L. E. WOOD.
ARMATURE WINDING MACHINE.
APPLICATION FILED SEPT. 30, 1918.
1,375,745.
Patented Apr. 26, 1921.
4 SHEETS—SHEET 4.
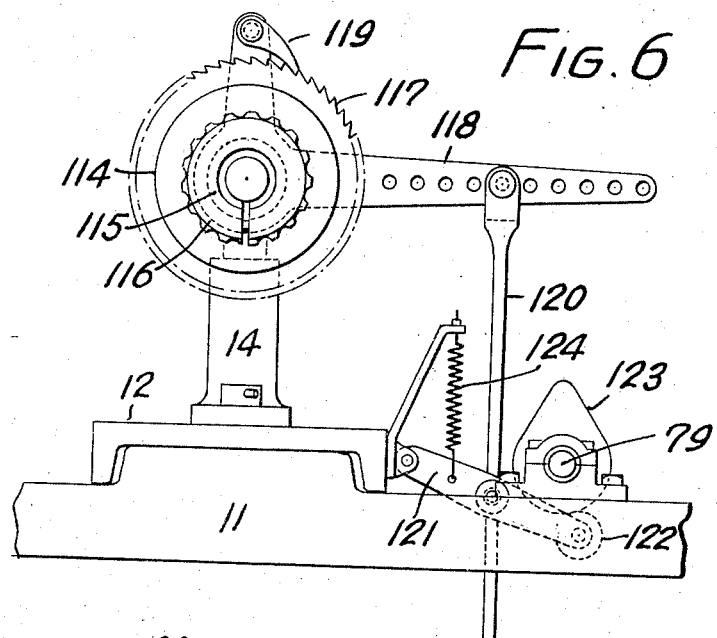
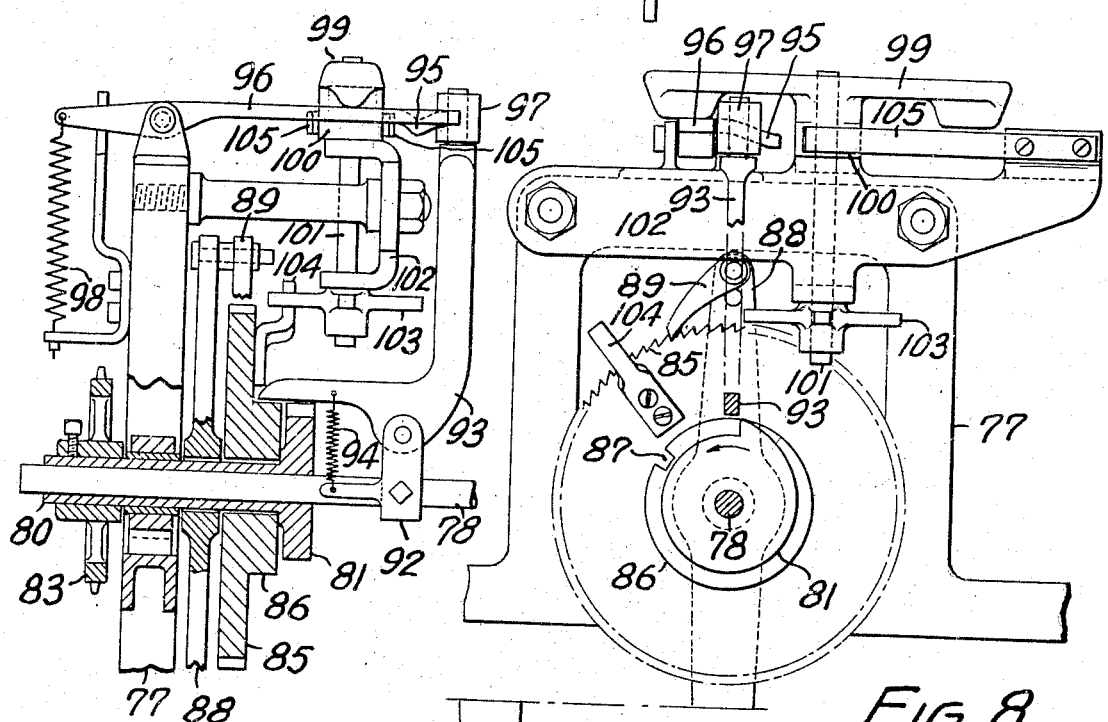
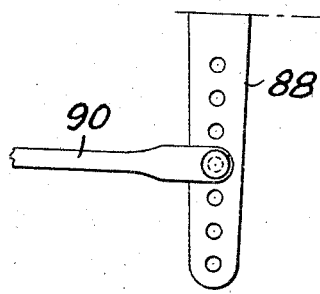
Inventor
Leonard E. Wood
By Fetherstonhaugh & Co
Attys.

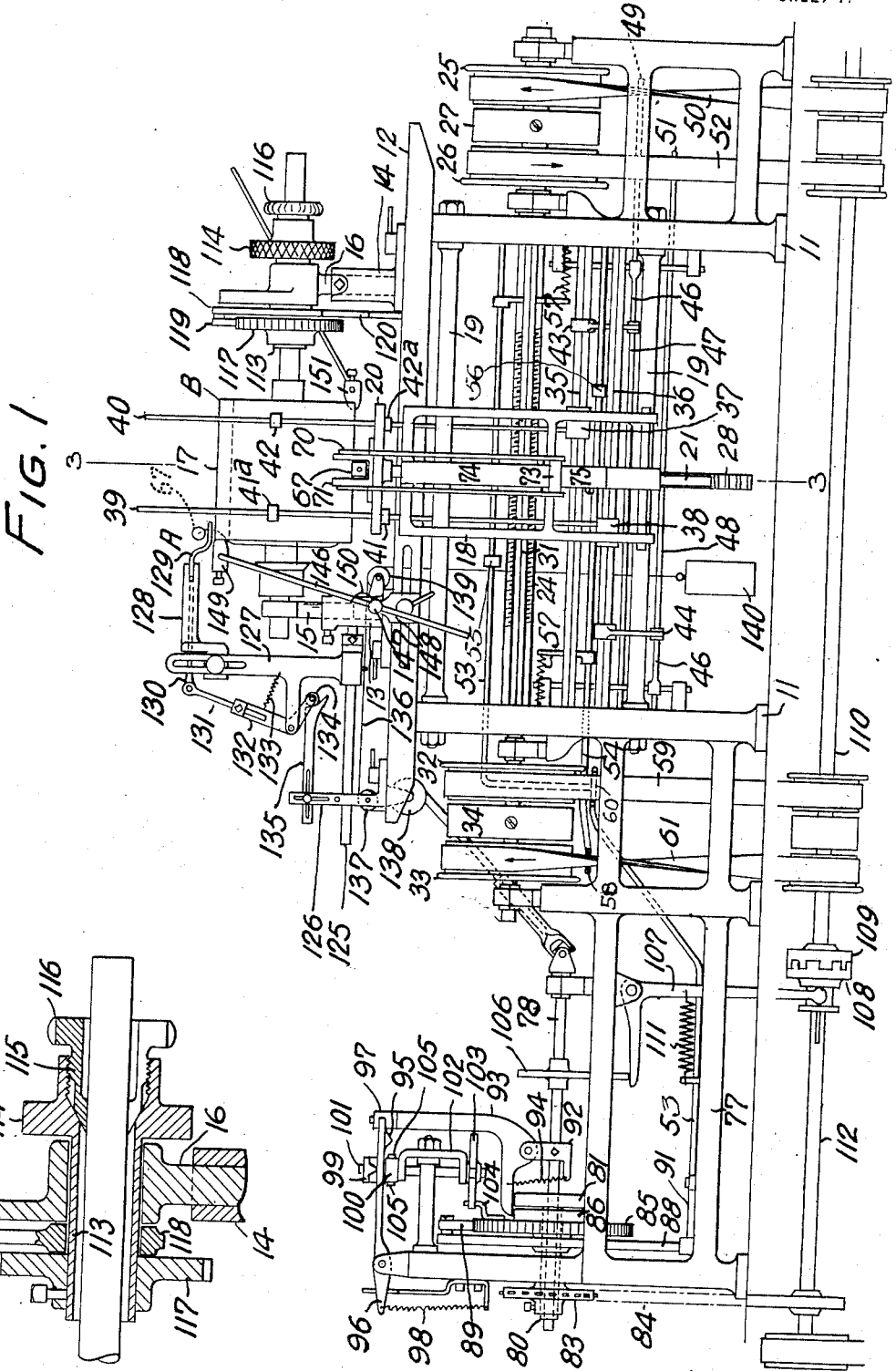

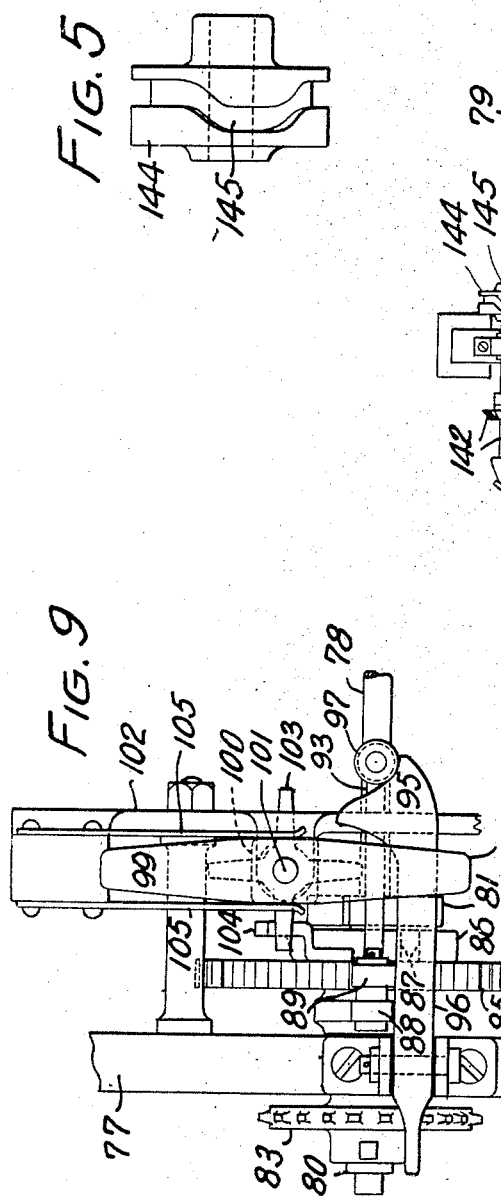
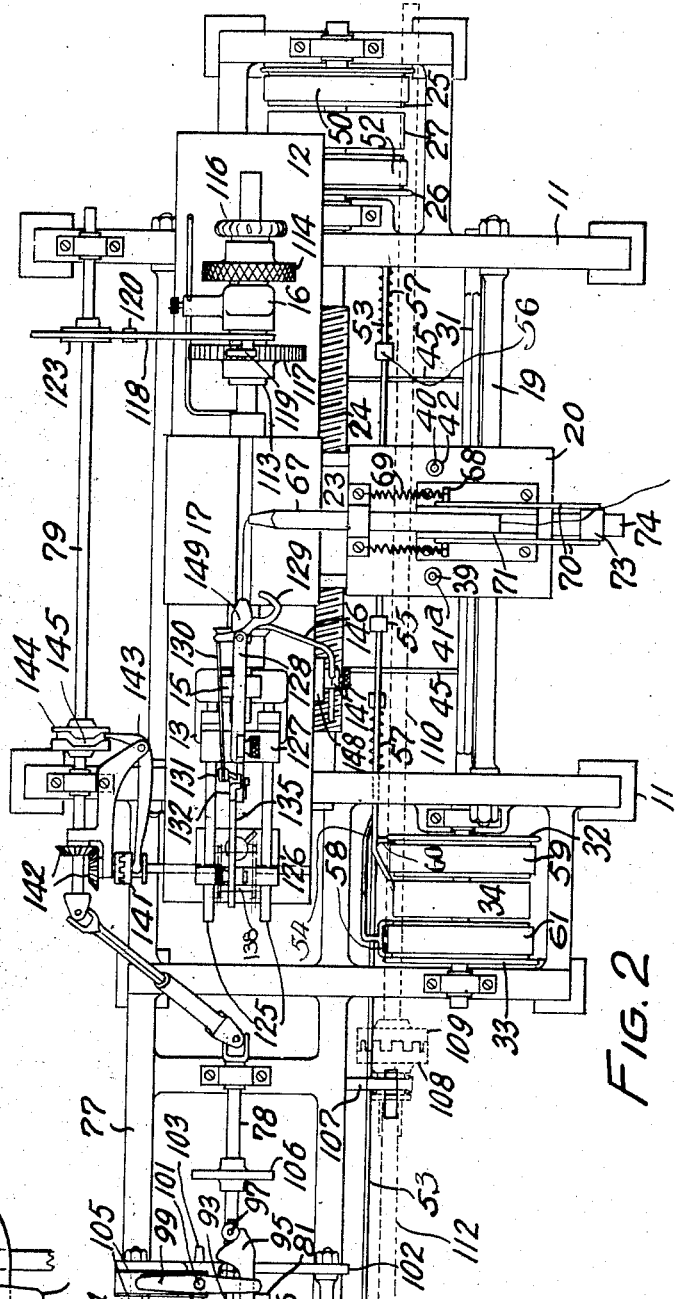

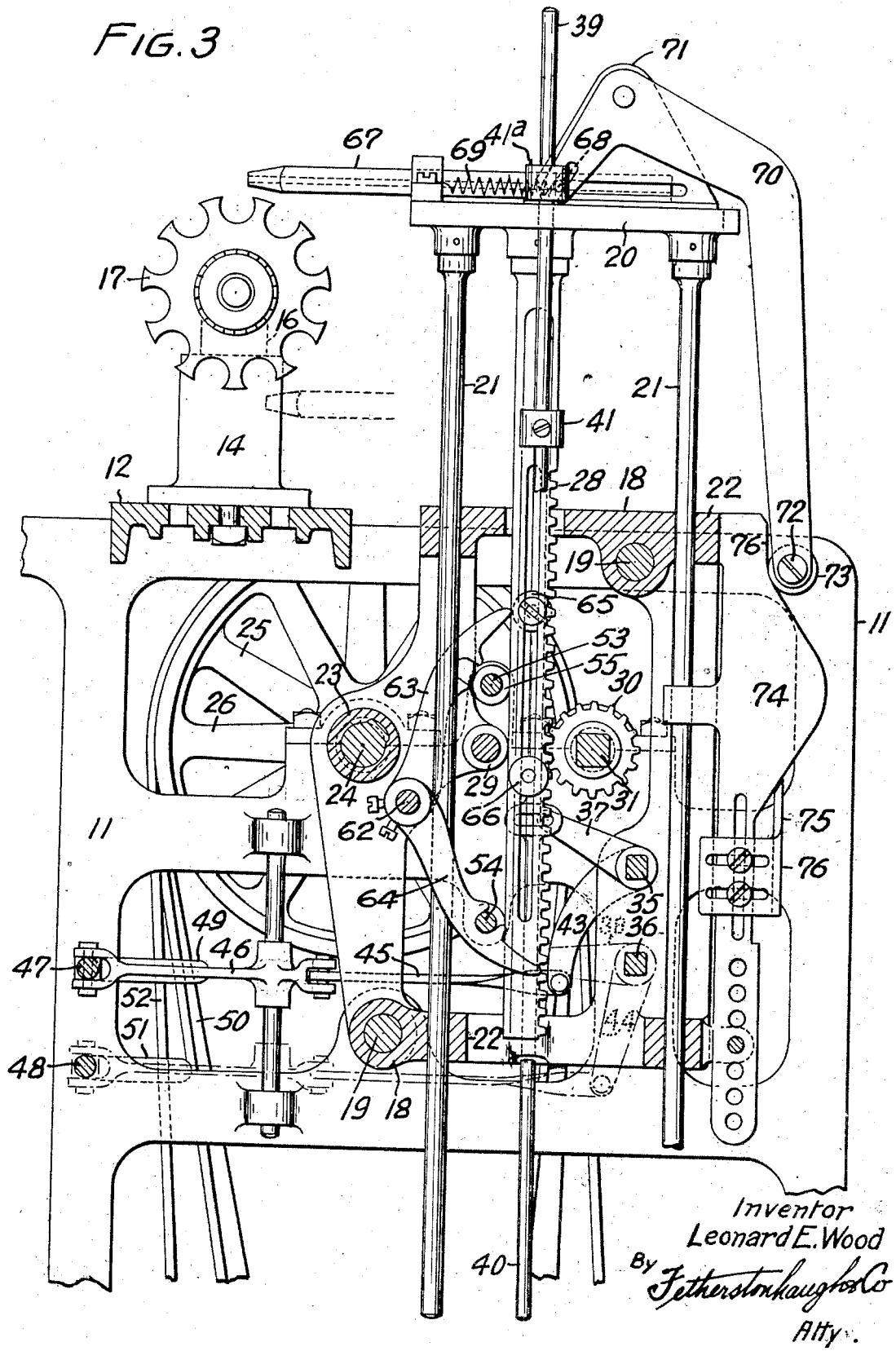

UNITED STATES PATENT OFFICE.

LEONARD E. WOOD, OF VALLEYFIELD, QUEBEC, CANADA.

ARMATURE-WINDING MACHINE.

1,375,745. Specification of Letters Patent. Patented Apr. 26, 1921.

Application filed September 30, 1918. Serial No. 256,279.

*To all whom it may concern:*

Be it known that I, LEONARD E. WOOD, of the city of Valleyfield, in the Province of Quebec and Dominion of Canada, a subject of the King of Great Britain, have invented certain new and useful Improvements in Armature-Winding Machines, of which the following is a full, clear, and exact description.

This invention relates to improvements in machines for winding motor armatures, and the objects of the invention are to provide a machine, which will be entirely automatic in its action and when once set in motion will place a predetermined number of turns of wire in each coil, automatically shifting the armature to wind further coils.

A further object is to provide a machine which will produce either single or double wound armatures with equal facility.

A still further object is to produce a winding machine which will automatically form loops between the coils, for the purpose of connecting the coils to the commutator bars.

Another object is to provide a machine which will wind armatures with extreme rapidity and uniformity.

At the present time, small armatures of the slotted type are wound almost entirely by hand, owing to the impossibility of forming the coils separately, as is done in the case of large motors, and also to the difficulty of handling small armatures in any sort of a winding machine. Large and heavy slotted armatures are sometimes machine wound to the extent that the armature is supported in a device similar to a lathe, and the coils wound in by semi-mechanical means. In any event, the operator is compelled to stay by the machine to control any winding means which may be used and to shift the armature from coil to coil. There are, however, according to modern practice, comparatively few large slotted armatures, whereas there are a great number of small slotted armatures.

According to this invention, an armature to be wound is mounted by means of its shaft in a suitable frame, which may be adjusted according to the size of the armature. The machine having been adjusted, it is set in motion and thereafter is entirely automatic in its action until the armature is completely wound. When the correct number of turns of wire are on a coil, a counting device accomplishes the temporary stoppage of the winding while the armature is shifted to wind the next coil. An automatically operating device forms a loop in the wire between the coils, so that the ends of the coils are ready for connecting to the commutator bars. When the armature is completely wound, the machine will stop itself automatically. It will be obvious that owing to the entirely mechanical operation of the device, the winding will be absolutely uniform as to tension and packing of the wire in the coils, so that a neater and more compact armature will result than can be obtained by hand winding at a reasonable cost. This will also permit of more turns of wire per coil without increasing the dimensions of the armature and, therefore, a more powerful armature.

In the drawings which illustrate this invention;—

Figure 1 is a front elevation of the machine.

Fig. 2 is a plan view.

Fig. 3 is a vertical cross sectional view on an enlarged scale on the line 3—3, Fig. 1.

Fig. 4 is an enlarged vertical longitudinal section of the armature shifting means.

Fig. 5 is an end elevation of the cam controlling the loop forming mechanism.

Fig. 6 is an end elevation of the armature shifting mechanism.

Fig. 7 is a front elevation of the counting mechanism, partly in section, on an enlarged scale.

Fig. 8 is an end elevation of the counting mechanism.

Fig. 9 is a plan view of the counting mechanism.

Referring more particularly to the drawings, 11 designates a framework having a movable bed or gauntree 12 mounted thereon. Pedestals 13 and 14 are adjustably mounted on the gauntree and carry vertically adjustable bearings 15 and 16 respectively for the shaft of an armature 17 to be wound.

A carriage frame 18 is mounted for sliding movement between the frames 11 on guides 19 connected between the frames. This carriage frame supports a table 20 mounted on vertical guiding posts 21, which slide in guides 22 formed in the carriage frame. The rear portion of the carriage frame is provided with a fixed nut 23, through which operates a screw 24 mounted in bearings on the frames 11 and provided at one end with loose pulleys 25 and 26 and an intermediate fixed pulley 27. Rotation of the screw serves to move the carriage back and forth. The table 20 is provided with a rack-toothed operating post 28, which slides vertically through the carriage and against a guide roll 29. A pinion 30 is mounted in the carriage in mesh with the rack 28 and is mounted slidably but irrevolubly on a shaft 31, journaled in the frame 11 and provided at one end with loose pulleys 32 and 33 and with an intermediate fixed pulley 34. Rotation of the shaft will operate the rack and pinion mechanism to raise or lower the table and, as the pinion is slidable on the shaft 31, this raising and lowering of the table may be effected at any point in the travel of the carriage.

A pair of shafts 35 and 36 are revolubly mounted in the frames 11 parallel with the guides 19. These shafts carry lever arms 37 and 38, which are slidably but irrevolubly mounted thereon. This may be conveniently accomplished by providing the shafts 35 and 36 with one or more flat sides or with a key slot. These levers which are revolubly and non-slidably mounted in the carriage move with the carriage 18 and are connected to vertically extending rods 39 and 40 having adjustable stops 41, 41$^a$ and 42, 42$^a$ thereon; the stops 41 and 42$^a$ being located below the table 20 and the stops 41$^a$ and 42 above the table. A second pair of levers 43 and 44 are irrevolubly mounted at the ends of the shafts 35 and 36. The extremities of these levers are connected by links 45 and bell crank levers 46 with rods 47 and 48 slidably mounted between the frames 11 parallel with the guides 19. Thus the vertical rod 39 is linked up with the horizontal rod 48 and the rod 40 with the rod 47. The rod 47 carries a belt shifter 49 embracing the belt 50 on the loose pulley 25, while the rod 48 carries a belt shifter 51 embracing the belt 52 in the loose pulley 26. A pair of rods 53 and 54 are slidably mounted between the end frames 11 parallel with the guides 19. The rods are provided with adjustable stops 55 and 56 and with springs 57 connected between the rods and the end frames 11 and arranged to draw the rods respectively to the right and to the left. The rod 54 carries a belt shifter 58 embracing the belt 61 on the loose pulley 33 and the rod 53 carries a belt shifter 60 embracing the belt 59 on the loose pulley 32. A shaft 62 is revolubly journaled in the carriage 18 and carries a pair of notched arms 63 and 64 adjustably fixed thereto. These arms are adapted to embrace the rods 53 and 54 respectively and are so set on the shaft that when one of them is in engagement with a rod the other one is out of engagement. These arms are arranged one on each side of and close to the table operating rack 28 so as to be engageable by stops 65 and 66 adjustably mounted on the rack.

A tubular wire guide 67 is slidably mounted on the table 20 and is provided with transversely projecting pins 68 which are connected by springs 69 with the table, so that the guide is constantly urged toward the armature 17. A pair of bell crank levers 70 are pivotally mounted on a support 71 carried by the table. The shorter arms of these levers are bifurcated at their extremities to embrace the pins 68 of the wire guide, while the extremities of the long arms are connected by a pin 72 carrying a roller 73, which travels on a cam 74 vertically adjustable on the carriage. The cam 74 includes an adjustable part 75, so that the profile of the cam may be altered according to the armature to be wound. The cam includes straight portions or dwells 76 which are normally in alinement, and it is the adjustable part 75 which forms one of these dwells and which by its adjustment permits the dwells to be set out of alinement, as shown in Fig. 3. This completes the actual mechanism for moving the carriage back and forth and the table up and down and also for moving the wire guide in and out to pass the shaft and commutator of an armature that is being wound.

The means for supporting and rotating the armature and also for counting the number of turns of wire wound in each coil and for forming loops in the wire between each coil will now be described. At the left hand end of the machine, an extension 77 of the frame 11 is provided, on which is journaled a shaft 78 connecting by any suitable means with a shaft 79 journaled at the back of the gauntree 12. This shaft is freely revoluble within a sleeve 80 which is also revoluble in the framework. The sleeve is provided at its inner end with a flange 81 having the edge thereof in the form of a single stepped spiral cam. The outer end of the sleeve has fixed thereto a sprocket wheel 83, which is driven by a chain 84 from the driving shaft 112, which extends under the entire machine and drives the belts 50, 52, 59 and 61, so that the sleeve will revolve constantly. A ratchet wheel 85 is revolubly mounted on the sleeve and is provided with a hub or boss 86 having a notch 87 therein. A lever 88 is pivoted adjacent the ratchet wheel 85, conveniently on the sleeve 80, and carries an adjustably mounted pawl 89 engaging the teeth of the ratchet wheel 85. This lever is connected to a link 90 which has adjustable connection with one arm of a bell crank lever 91, the other arm of which is connected with the belt shifting rod 53. By adjusting the link 90 in the lever 88 and also the pawl 89, the ratchet wheel may be rotated any desired number of teeth at each operation of the belt shifting rod. A block 92 is fixedly mounted on the shaft 78 and carries a pivoted catch 93 which may be drawn by the spring 94 into the notch 87 of the hub 86 and also against the cam 81. This catch is normally held clear of the hub 86 and cam 81 by a cam 95 mounted on the extremity of an arm 96, which is pivoted in the frame 77. The catch may be provided with a roller 97 to facilitate its engagement with the cam 95. The arm 96 is provided with a spring 98, which operates to lift the cam clear of the catch. The arm is normally held depressed, so that the cam engages the catch, by means of a double-ended rotary cam 99, having a square hub 100 fixedly mounted on a spindle 101 journaled in a bracket 102 supported on the frame 77. The lower end of the spindle 101 carries a four-toothed star wheel 103, the teeth of which may be engaged by a single tooth 104 projecting from the side of the ratchet wheel 85. A pair of flat springs 105 are secured to the bracket 102 and embrace between them the square hub 100 of the cam 99 and operate to releasably hold the cam in position and to expedite its movement when the said movement has been initiated. A cam 106 is secured to the shaft 78 and engages when the catch 93 is at rest with a lever 107, which holds the driving member 108 of a clutch in mesh with the driven member 109 connected to the counter shaft 110, from which the belts of the winding mechanism are driven. A spring 111 is provided to shift the lever 107 as soon as it is released by the cam 106 and disengage the clutch, thus separating the counter shaft 110 from the driving shaft 112.

The armature supporting bearing 16 contains a revoluble sleeve 113 having toward its outer end a flange 114 knurled on the edge. The outer end of this sleeve is internally threaded and tapered beyond the thread to receive an externally threaded, taper-pointed, split bush 115, which is also provided with a flange 116 knurled on the edge. This arrangement adapts the device to any size of armature shaft within the limits of the machine. The armature shaft is passed through the sleeve and bushing and is then secured to the sleeve by screwing in the bushing until it contracts and wedges between the shaft and sleeve and also centers the shaft in the sleeve. In this operation, the flange 114 may be grasped to hold the sleeve against rotation and the bushing turned by means of its flange 116. A ratchet wheel 117 is fixed to the sleeve 113 and a bell crank lever 118 is pivoted on the sleeve. One arm of this lever carries a pawl 119 positioned to engage the ratchet wheel 117 and the other arm has adjustable connection with a link 120, which is pivotally connected to a lever 121, the opposite end of which is pivoted to the gauntree. This lever carries a roller 122 which travels on a cam 123 mounted on the shaft 79. By adjusting the link 120 on the lever 118, the pawl may be made to travel any suitable number of teeth on the ratchet wheel. A spring 124 returns the parts to normal position.

The loop forming mechanism is slidably mounted on a pair of rails 125, which are each supported at one end in the armature support 13 and at the opposite end in a bracket 126 carried by the gauntree. The forming mechanism comprises a post 127 sliding on the rails 125 and slotted at its upper end to receive a vertically adjustable arm 128 carrying the pivotally mounted loop forming hook 129. The hook 129 is connected by means of a link 130 with the adjustable arm 131 of a bell crank lever 132 mounted on the post 127. A spring 133 is connected to the lever 132 and operates to urge the hook to inoperative position. The other arm of the bell crank lever carries a roller 134 adapted to travel on a cam 135 carried by the bracket 126 and to move the hook into operative position. A cable, chain or strap 136 is connected intermediate its ends to the post. On one side of the post, the cable passes over an idler roll 137 and winds on a drum 138 revolubly mounted in the bracket 126. On the opposite side of the post, the chain passes over a roller 139 and carries a weight 140, which tends to draw the post toward the armature. The drum 138 is driven through a clutch 141 and bevel gears 142 from the shaft 79. The clutch is controlled by a throwing lever 143 and a grooved cam 144 mounted on a shaft 79, the end of the lever engaging in the cam groove. The cam groove is provided with a portion 145 offset from the remainder of the groove, so that rotation of the cam will produce movement of the lever during a part of its operation and will hold the lever rigid during the remainder.

In forming the loop, it is necessary to hold in place the wire which traverses the end of the armature, and for this purpose, a combined armature lock and wire holder is provided. This device comprises an arm 146 pivotally and adjustably mounted on a post 147 springing from a bracket 148 on the gauntree. The extremity of this arm carries an adjustably mounted head 149, which is adapted to enter the end of the upper armature slot which is being wound and hold the wire therein. This also serves to hold the armature against accidental rotation. Each time the wire guide comes around, it passes under and displaces the head 149, the head being returned to position by its spring 150. In order that the armature may not be free to revolve when the head 149 is lifted by the wire guide, a second similarly mounted head 151 is provided at the opposite end of the armature and is adapted to engage in the lower slot. It will thus be seen that there will be always one head engaging and holding both the armature and the coil in process of winding. When these heads are released by the wire guide and snap back into position, they serve to pack the wire tightly in the armature slots.

The operation may be described under two heads, namely, the actual winding mechanism and the controlling means therefor. The gauntree is adjusted a proper distance from the carriage and the supports 13 and 14 adjusted a proper distance apart on the gauntree, and finally the bearings 15 and 16 vertically adjusted. These adjustments will accommodate any armature within the capacity of the machine. The armature is then placed in the bearings 15 and 16 and the bush 115 tightened to secure it in place and impart the necessary rotative force. The winding wire is threaded through the guide 67 and the end secured in any suitable manner.

The carriage and table are positioned to locate the guide tip in line with the left hand end of the top slot of the armature as shown at A, Fig. 1. In this position the rod 40 is raised, by the table striking the stop 42, and operates through the lever 37 to rock the shaft 35, which operates the belt shifter 49 through the medium of lever 43, link 45, lever 46 and rod 47, to shift the belt 50 on to the fixed pulley 27. In the raised position of the table, the arm 64 spans the rod 54 operating the shifter 58 of belt 61. The screw 24 revolves and moves the carriage to the right, laying the wire in the top slot of the armature. When the wire guide approaches B the arm 64 strikes the stop on rod 54 and draws the rod to the right against the spring 57, so that the shifter 58 transfers the belt 61 from the loose pulley 33 to the fixed pulley 34, which drives the rack and pinion mechanism and lowers the table in the carriage, bringing the wire guide down past the end of the armature. The downward movement of the table does three things;—Firstly, it strikes stop 42ª of the previously raised rod 40 and forces the rod down to rock the shaft 35 and operate the belt shifter to return the belt 50 to its loose pulley, so that carriage movement to the right ceases. Secondly, near the completion of its drop, the table carries the stop 66 against the arm 64 to disengage same from the rod 54 and engage the arm 63 with the rod 53. When the rod 54 is released, the spring 57 returns same to its original position and the belt 61 is thus returned to its loose pulley 33, and downward movement ceases. Thirdly, the table engages the stop 41 on the rod 39 and drives down the rod to operate the lever 38, rock the shaft 36 which acts through lever 44, link 45 and lever 46 to move the rod 48, and operate the belt shifter 51 to move belt 52 onto the fixed pulley 27, so that the screw 70 is revolved in the reverse direction and the carriage moved from right to left, laying wire in a bottom slot of the armature. On approaching the left hand limit of its travel, the carriage arm 63 strikes the stop 55 on the rod 53 and operates the belt shifter 50 to place belt 59 on the fixed pulley 34, so that the rack and pinion mechanism is operated to raise the table. In its upward movement, the table performs functions similar to those performed in descending, i. e., strikes the stop 41ª on rod 39 and returns belt 52 to its loose pulley 26, thus stopping the carriage movement, and later strikes the arm 63 disengaging same from the rod 53, so that belt 59 is returned to loose pulley 32 and table movement stopped, and also engaging arm 64 with rod 54 in readiness for the descending movement. The upward movement also raises rod 40 as previously described to shift belt 50 onto the fixed pulley 27. When the wire guide arrives at point A, one cycle of movement has been completed.

Each succeeding turn of wire in the coil is wound on in exactly the same manner and the winding will continue until the wire is exhausted or the machine stopped.

Stoppage of the machine when the correct number of turns have been wound on a coil is effected by the counting mechanism at the left hand end of the machine. This mechanism is normally at rest and in the position shown in full lines, with the exception of the constantly rotating cam 81 and the lever 88 and pawl 89. Before starting to wind an armature, the number of turns per coil is determined and divided into the number of teeth on the ratchet wheel 85 and the movement of the pawl 89 adjusted accordingly, so that it will have moved the ratchet wheel through one revolution when the last turn of the coil is being completed. For example, if the ratchet wheel 85 has a hundred teeth and fifty turns of wire are desired in each coil, the pawl 89 is adjusted to move the distance of two teeth on the ratchet wheel at a time. The lever 88 carrying the pawl is operated by the belt shifting rod 53, which controls the upward movement of the wire guide, that is, the last movement required to complete any given cycle. Each time the belt shifting rod 53 is operated, it causes the ratchet wheel to be rotated the distance of two teeth, thus fifty operations of the belt shifter produce one complete revolution of the ratchet wheel. When the ratchet wheel completes its revolution, the single tooth 104 thereon shifts the star wheel 103, thus turning the cam 99 and releasing the arm 96, which rises under the action of its spring and releases the catch 93. When the cam 99 has been turned through approximately 45°, against the action of the springs 105 embracing its square hub, the springs become effective and complete the turning movement with great rapidity, thus placing another tooth of the star wheel 103 in readiness to be engaged by the ratchet wheel tooth 104. When the catch 93 is released, its spring draws it down into the notch 87 of the ratchet wheel hub and also in front of the step of the cam 81, which is positively driven from the drive shaft 112. This connects the shaft 78 with the cam, so that the shaft is revolved and drives the shaft 79 on the gauntree. As soon as the shaft 78 commences to revolve, the cam 106 releases the lever 107, and the spring 111 throws out the clutch 109, thus disconnecting the counter shaft 110, which drives the winding mechanism, and stops the winding mechanism. The normal position of the loop forming mechanism is at the outer end of the guides 125, away from the armature and holding the last formed loop during the winding of the entire succeeding coil. When the shaft 79 commences to revolve, the end of the lever 143 enters the offset portion or throw 145 of the cam 144 and disengages the clutch 141, so that the loop former is released and is drawn toward the armature by the weight 140. As the former moves toward the armature the forming hook 129 merely travels through the loop which it has been holding. Just before the former comes to rest, the roller 134 slips off the end of the cam 135 and the spring 133 of the lever 132 moves the lever and link 130 to throw the hook 129 sidewise out of the loop and out of the path of the wire which has been laid upon the end of the armature by the guide 67. By the time this movement has occurred, the lever 143 has passed out of the throw 145 of the cam groove and by its movement engages the clutch 141, so that movement of the shaft 79 is transmitted through the gears 142 and clutch 141 to the drum 138 to rotate the same. Rotation of the drum winds up the cable 136 and draws the former away from the armature to the position from which it started. In the first part of the movement, the roller 134 jumps over the end of the cam 135 and the consequent movement of the lever 132 is transmitted to the hook 129 and causes it to engage the wire just laid by the guide 67. The former now moves out and the wire, being held by the holder 149, a loop is formed, the wire therefor being drawn from the guide. When the former reaches its outermost position, the end of the lever 143 is just about to enter the throw 145 of the cam, i. e., the shaft 79 has made one complete revolution, and its movement is then stopped by a single tooth 104 of the ratchet wheel engaging the star wheel 103 and rotating the cam 99 to draw the arm 96 down until its cam 95 is in the path of the roller on the catch 93. The catch climbing over the cam 95 is drawn out of engagement with the cam 81 and out of the notch 87 of the ratchet wheel, thus stopping and holding the shaft 78 and consequently the shaft 79. Concurrently with this movement, the cam 106 on the shaft 78 operates the clutch lever 107 to throw in the clutch 108 and start the winding mechanism in operation.

The automatic revolution of the armature to present fresh slots for winding is effected simultaneously with the loop forming. When setting up the machine, the position of the link 120 on the pawl lever 118 is adjusted to regulate the angle of lever movement to equal the angle of desired armature revolution. When the shaft 79 revolves, the cam 123 thereon rocks the lever 121 carrying the link 120 and oscillates the pawl lever 118 through the angle for which it has been set. The pawl 119, in engagement with the ratchet wheel 117 on the clutch which grips the armature shaft, revolves the clutch and armature so that a fresh pair of slots are brought into the plane in which the wire guide operates.

By adjusting the various stops, the travel of the carriage and table will be limited to the exact distance required for the winding of any armature within the capacity of the machine. Armatures may be given either single or double winding. In the case of single wound armatures which have an even number of slots, the movable cam part 75 will be set in line with the upper dwell 76, so that the nose of the wire guide will occupy the same vertical plane in both its upper and lower positions, but with a double wound armature having an odd number of slots, the part 75 will be set out of line with the upper dwell 76, as shown, so that in its lower position the wire guide will register with a slot out of the vertical plane of the topmost slot. The only attention which the machine needs is that required to set up the armature ready for winding and to stop the machine when the armature is completely wound.

It is obvious that a single operator may attend a considerable number of machines, so that for any given number of armatures, a great saving in labor will be effected, as compared with hand winding. This saving will be greatly increased by the fact that the machine will wind armatures much more rapidly than it is possible to do by hand. The armatures wound by this machine will be much more regular and uniform as to the laying of the wire in the coils than is possible with hand winding, so that the armatures will have a better appearance and better balance, and it will be possible to put a greater number of turns of wire in each coil without increasing the size of the armature. Other advantages will be a slight saving in the length of wire required and absolute accuracy and uniformity in the number of turns per coil. Another advantage of this invention is that since the wire is continuous throughout the armature, the wire may be under electric test throughout the winding (in the same manner that electric cables are under test during manufacture), so that a break in the wide will be immediately detected and the winding stopped.

Having thus described my invention, what I claim is:—

1. In an armature winding machine, an armature support, a wire guide, means for moving the guide to wind coils of wire in the slots of an armature, counting mechanism for automatically stopping the guide moving means on the completion of each coil and for automatically starting it to wind a new coil, and means for automatically moving the armature between the stopping and starting of the guide moving means to present fresh slots for winding and means for engaging and holding each successive turn of wire as it is laid in the armature slots.

2. In a device according to claim 1, means for forming a loop between each coil of an armature.

3. In an armature winding machine, means for laying wire in the slots of an armature, and means for holding the wire thus laid and for packing the wire tightly in the slots.

4. In an armature winding machine, means for winding coils of wire in the slots of an armature, means for forming loops between the coils arranged to hold the loops during partial winding of each new coil, and means for holding wire already wound in position during the formation of the loops.

5. In an armature winding machine, means for winding coils of wire in the slots of an armature, loop forming means lying normally out of the path of the winding means, means for automatically stopping the winding mechanism on the completion of a coil, for moving the loop forming means into the path of the winding means during its period of rest and for actuating the loop forming means to draw a loop in the wire, and means for holding the wound wire during formation of the loop.

6. In an armature winding machine, means for winding coils of wire in the slots of an armature, means for counting the number of turns of wire wound in each coil and for automatically stopping and starting the winding means, a shaft, loop forming means and armature shifting means driven by said shaft, and means operated by the counting mechanism to start and stop said shaft during the periods of rest of the winding means, and spring actuated means for holding the wire in the armature slots during winding and during loop forming.

7. In an armature winding machine, means for winding coils of wire in the slots of an armature, means for counting the number of turns of wire wound in each coil, a shaft, stopping and starting means for said shaft controlled by the counting means, stopping and starting mechanism for the winding means controlled by said shaft, loop forming means and armature shifting means driven by said shaft and means independent of the operation of the winding and loop forming means for holding wire wound on the armature.

8. In an armature winding machine, a wire guide, supporting means for the wire guide arranged to move the same right and left and up and down, individual driving means for the said four movements and means operated by the movement of the wire guide support for throwing said driving means individually into and out of operative connection with the wire guide.

9. In an armature winding machine according to claim 8 adjustable means in the path of the wire guide support arranged to simultaneously disconnect means driving the wire guide in a horizontal direction and connect means driving the guide in a vertical direction and subsequently to simultaneously disconnect means driving the guide in a vertical direction and connect the means driving the guide in a horizontal direction.

10. In an armature winding machine, the wire guide support therefor movable horizontally and vertically, individual drives for said support to move the guide right and left and up and down, means operated by the horizontal movement of the support to disconnect the right or left driving means and to connect the up or down driving means, and means operated by the vertical movement of the support to disconnect the up or down driving means and to connect the right or left driving means.

11. In an armature winding machine, the combination with the elements of claim 10 of a mechanism for counting the number of turns of wire wound in a coil actuated by one of said drive controlling means.

12. In an armature winding machine, a wire guide support movable horizontally and vertically, individual drives for said support to move the guide right and left and up and down, means operated by the horizontal movement of the support to disconnect the right and left driving means and to connect the up or down driving means, means operated by the vertical movement of the support to disconnect the up or down driving means and to connect the right or left driving means; a mechanism for counting the number of turns of wire to be wound in a coil actuated by one of said drive controlling means, and means actuated by said counting mechanism for stopping and starting the winding mechanism.

13. In combination with a device according to claim 12, means for rotating an armature controlled by the counting mechanism and operable during stoppage of the winding mechanism.

14. In combination with a device according to claim 12, means for forming loops of wire between the coils of an armature controlled by said counting mechanism and operable during stoppage of the winding mechanism.

15. In combination with a device according to claim 12, adjustable means for rotating an armature predetermined amounts and means for forming loops of wire between the coils of an armature both of said means being controlled by the counting mechanism and operating simultaneously during the stoppage of the winding mechanism.

16. In an armature winding machine, a source of power, a winding mechanism, a shaft driven by said source of power, a counting mechanism driven in part by said winding mechanism and in part directly from said source of power, a timing shaft, means operated by said timing shaft for disconnecting the winding mechanism from the source of power, an armature rotating means operated by said timing shaft, and means operated by said timing shaft for forming and holding loops between the armature coils, and means adjustable according to the number of turns of wire desired in each coil and actuated by the winding mechanism when the desired number of turns have been wound in a coil to operatively connect the timing shaft with the source of power, said actuating mechanism and means for connecting the timing shaft and source of power comprising a sleeve revoluble on the timing shaft and driven by the source of power, a single stepped cam carried by said sleeve, a ratchet wheel revoluble on said sleeve having a notched hub, said wheel being operated a predetermined fraction of a revolution by the winding mechanism on the completion of each turn of wire in a coil, a catch mounted on the timing shaft, an oscillating cam normally holding said catch out of engagement with the cam step and the notch of the ratchet wheel hub, a second cam holding the oscillating cam in catch holding position, a star wheel connected to said second cam and a single tooth on the ratchet wheel positioned to rotate said star wheel and second cam when the sleeve cam step and ratchet wheel notch are in alinement with the catch.

17. In combination with a device according to claim 16, a square hub on said second cam and a pair of springs pressing against opposite sides of said hub and operating to complete rotation of the cam and clear same from the path of the oscillating cam with great rapidity.

18. In combination with a device according to claim 16, a loop forming mechanism comprising a post shifting means therefor driven from the timing shaft including a clutch, a cam on the timing shaft, a clutch throwing lever operated by said cam, a loop forming hook, means for moving said hook to engage the wire including a lever carried by the post and a stationary cam in the path of said lever.

19. A device according to claim 16, in which the loop forming means occupies a position remote from the armature during winding of a coil and holds the loop extended, means for moving said hook toward the armature during stoppage of the winding mechanism and means for operating the hook when adjacent the armature to release the loop formally held and reëngage the wire to form a fresh loop.

20. A device according to claim 16, in which the armature shifting means comprises a clutch adapted to engage the shaft of an armature being wound, a ratchet wheel fixed to said clutch, a bell crank lever, a pawl on said lever engaging the ratchet wheel; a cam on the timing shaft and operative connection between said cam and lever adjustable according to the amount of armature desired and adapted to shift the armature the desired amount at each rotation of the timing shaft.

21. A device according to claim 16, in which the timing shaft operates through only one revolution during each stoppage of the winding mechanism and operates to reset the counting mechanism and start the winding mechanism on the completion of each revolution.

22. In an armature winding machine, a framework, a carriage slidable horizontally therein, a table supported by the carriage, a wire guide on the table, means for moving the carriage to right and left, means for moving the table up and down in the carriage and means in the path of the carriage for stopping its movement and starting the table in movement and means in the path of the table for stopping its movement and starting the carriage in movement.

23. A device according to claim 22, in which the carriage driving means includes a screw revoluble in opposite directions, a nut on said screw mounted in the carriage and means in the path of the carriage controlling the drives of said screw.

24. A device according to claim 22, in which shifting means of the table includes a shaft revoluble in opposite directions, a pinion in the carriage slidable but irrevoluble, a rack carried by the table meshing with said pinion and means in the path of the carriage controlling the drives of said shaft.

25. A device according to claim 22, in which the means controlling the drive of the table includes rods operatively connected to the table, driving means, adjustable stops on said rods, a pair of oscillable catches mounted in the carriage and means carried by the table for positioning said catches in and out of alinement with the stops.

26. In an armature winding machine, a carriage, a vertically movable table thereon, a wire guide slidably mounted on said table, a lever operatively connected at one end with said wire guide, a cam adjustably mounted on the carriage in the path of the other end of said lever and an adjustable part in said cam.

In witness whereof I have hereunto set my hand.

LEONARD E. WOOD.